United States Patent
Tarshis et al.

[15] 3,696,500
[45] Oct. 10, 1972

[54] SUPERALLOY SEGREGATE BRAZE

[72] Inventors: Lemuel A. Tarshis, Latham; James L. Walker, Schenectady, both of N.Y.; Thomas F. Berry, Cincinnati, Ohio

[73] Assignee: General Electric Company

[22] Filed: Dec. 14, 1970

[21] Appl. No.: 97,915

[52] U.S. Cl. ....................................29/487, 29/504
[51] Int. Cl. ...........................................B23k 31/02
[58] Field of Search............29/487, 504, 194, 196.1

[56] References Cited

UNITED STATES PATENTS

| | | | |
|---|---|---|---|
| 2,957,239 | 10/1960 | Pritchard et al. | 29/504 X |
| 3,024,109 | 3/1962 | Hoppin et al. | 29/487 X |
| 3,530,568 | 9/1970 | Owczarski et al. | 29/504 X |
| 3,549,339 | 12/1970 | Cope | 29/194 |
| 3,632,319 | 1/1972 | Hoppin et al. | 29/487 |

OTHER PUBLICATIONS

Long, R. A., "Development of New Nickel-Base Brazing Alloys Having Ductility," Welding Journal Reserach Supplment, pp. 259-S to 264-S.

*Primary Examiner*—John F. Campbell
*Assistant Examiner*—Ronald J. Shore
*Attorney*—Richard R. Brainard, Paul A. Frank, Charles T. Watts, Nathan M. Briskin, Frank L. Neuhauser, Oscar B. Waddell and Joseph B. Forman

[57] ABSTRACT

A method of forming an integral joint bonding together superalloy pieces, and brazing alloy composition therefor. The process includes steps to locate and determine the chemical composition of the lowest melting segregate of a superalloy piece to be bonded, applying a prepared brazing material consisting essentially of said lowest melting segregate, and heating the pieces to be joined together with the brazing material. Subsequent progressive heat treatment of the pieces with the brazing material therebetween diffuses and solutionizes the brazing material components into the adjoining alloy pieces to homogenize the bond and make the joint zone an integral part of the joined members in microstructure and mechanical properties.

11 Claims, 6 Drawing Figures

Inventors:
Lemuel A. Tarshis,
James L. Walker,
Thomas F. Berry,
by
Their Attorney.

Inventors:
Lemuel A. Tarshis,
James L. Walker,
Thomas F. Berry,
by
Their Attorney.

Inventors:
Lemuel A. Tarshis,
James L. Walker,
Thomas F. Berry,
by
Their Attorney.

SUPERALLOY SEGREGATE BRAZE

This application relates to the bonding of superalloys of nickel, cobalt or iron base. More particularly, it relates to a method of bonding such alloys to make a substantially integral joint, and to specific brazing alloy compositions for such bonding.

Cross-reference is made at this time to co-pending application Ser. No. 841,093, now U.S. Pat. No. 3,632,319, in the names of George S. Hoppin, III, Reed E. Yount, Thomas F. Berry and James F. Barker entitled "DIFFUSION BONDING OF SUPERALLOY MEMBERS," filed July 11, 1969 and assigned to the assignee of the present invention.

BACKGROUND OF THE INVENTION

Development of improved power producing apparatus, for example turbomachinery such as jet engines, has created a need for improvement of joints between two bonded superalloy members forming part of such machinery. In an ideal joint the joining material would be integral with the component parts so that the juncture between the parts would be identical metallographically as well as in physical and mechanical properties. Heretofore, it has not been possible to achieve or even approach such ideal bonding with an intermediate bonding material.

One known method of joining metal components together is by applying pressure to plastically deform the joint surfaces to achieve perfect mating in atomic dimensions across the interface between the components. Pressure is applied to obtain the necessary intimate contact and to eliminate any gap or voids, and heat is applied to promote the necessary diffusion between the superalloy components being joined. This process is known as diffusion bonding. However, the pressures necessary to plastically deform the contacting surfaces places a severe limitation on the geometry of the components to be joined and restricts them to only simple shapes and to materials capable of withstanding such pressures required by the diffusion bonding process. Since turbine blades for jet engines have complicated geometries, in such parts the joining of surfaces which do not mate perfectly has led to attempts to fill the voids between the surfaces with a flowable plastic or liquifiable brazing material in order to obtain metal-to-metal contact.

The "activated diffusion bonding" process described in the above-mentioned co-pending application Ser. No. 841,093 differs from conventional brazing in that conventional brazing utilizes a braze alloy totally different from the components being joined, both in metallographic structure and in properties. In activated diffusion bonding, as described in the above-identified co-pending application, the need for pressure during the diffusion bonding is avoided. In activated diffusion bonding, since the superalloy melts at too high a temperature to use it as the braze composition, a joining composition is prepared which is identical to that of the superalloy but also contains melting point depressants such as boron, silicon, manganese, columbium, tantalum, and their mixtures. However, although specific alloy compositions have been determined in that manner which are useful for activated diffusion bonding and have satisfactory metallurgical and mechanical properties, problems can occur because some of the melting point depressants can also introduce undesirable properties, such as embrittlement, introduced by non-compatible phases in the microstructure of the brazing alloy.

SUMMARY OF THE INVENTION

It is therefore an object of the present invention to provide an improved method for forming between superalloy members substantially integral joints of material compatible with the superalloys on either side of the joined surfaces.

Another object of the invention is to provide a bonding material and method for determining a specific composition for such material having a lower melting temperature than the parts to be joined and which method will also avoid the introduction of non-compatible or foreign elements in sufficient quantity to introduce undesirable properties into the bond.

Still another object of the invention is to provide an improved bonding composition for use in such bonding method to form such an improved joint.

Still another object of the invention is to provide a method for producing a brazed bond which will be integral with and substantially equal in metallography and properties to the adjacent joined alloy parts, in strength and microstructure.

In accordance with these and other objects of this invention, one feature of the method includes the steps of: melting and casting a superalloy having one base selected from the group nickel-, cobalt-, and iron-base alloys; examining the microstructure of the cast superalloy for segregated low melting regions; determining quantitatively the chemical analysis of the low melting segregates; preparing a brazing alloy composition corresponding to the determined analysis; forming the prepared material into a disc or powder in accordance with standard brazing technology; applying the brazing material to the parts to be joined; and heating them together at a temperature at which the prepared braze alloy will melt but at which the superalloy components being joined remain solid.

As a further feature of the invention, the joined components, together with the intermediate braze alloy material bonded thereto are progressively heat treated in order to place the components of the braze alloy into solid solution in the adjoining superalloy so as to produce a bonded joint substantially integral with and substantially indistinguishable from the adjoining superalloy both in microstructure and properties.

These and other objects and advantages of the invention will be more fully understood and appreciated from the following detailed description and examples which are intended to be typical of, though not limiting, on the scope of the present invention.

BRIEF DESCRIPTION OF THE DRAWINGS

In the drawings:

FIG. 4a being a photomicrograph of Rene 100 in the as-cast condition, FIG. 4b being the same alloy in the partially solutionized condition, and FIG. 4c being the same alloy with part of the segregate in the incipiently melted condition.

Figure 1:
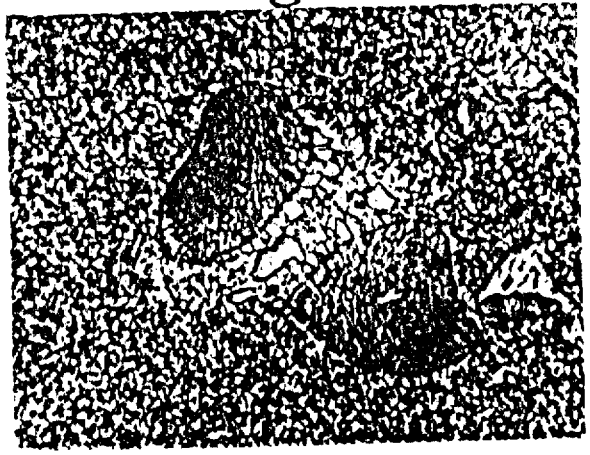
FIG. 1 is a photomicrograph (2,000 X) of a known nickel-base superalloy, Rene 80, with the segregate thereof outlined by dotted line for illustration purposes.

Alloys which are suitable for use in making the novel bonds of the present invention are preferably nickel base high temperature alloys and falling within the weight percentage ranges of Table I, although, as set forth further below, certain cobalt base alloys (Table II) and iron base alloys (Table III) are also suitable for use in accordance with the present invention.

The nickel base alloys referred to are those having the following weight percentage range of composition of ingredients:

TABLE I

Nickel Base Alloys

| Element | Weight Percent |
|---|---|
| Chromium | 2 to 25 |
| Aluminum | 0 9 |
| Titanium | 0 to 6 |
| Aluminum plus Titanium, at least | 3.5 |
| Cobalt | 0 to 30 |
| Molybdenum or Tungsten | 0 to 14 |

Balance essentially nickel in a quantity of at least 35 percent and preferably and usually more than 50 percent by weight, although, in addition to the foregoing constituents, the alloy may include the following elements in relatively minor quantities: carbon, boron, zirconium, vanadium, columbium, tantalum, iron, manganese, silicon with trivial amounts of impurities such as sulfur, phosphorus, copper, etc. which impurities do not deleteriously affect the microstructure and physical properties of the alloys described herein.

Certain cobalt-base alloys are also useful in the present invention and these include the alloys comprised within the following composition ranges:

TABLE II

Cobalt Base Alloys

| Element | Weight Percent |
|---|---|
| Chromium | 15 to 30 |
| Nickel | 0 to 20 |
| Tungsten | 4 to 15 |
| Tantalum | 0 to 10 | the balance of the alloy of Table II being essentially cobalt, preferably and usually more than 50 percent by weight and not less than 35 percent by weight of the total alloy. As with the nickel-base alloys, the cobalt-base alloys may include minor additions of titanium, carbon, zirconium, columbium, boron, iron, manganese, silicon and trivial amounts of impurities such as sulfur, phosphorous, copper, etc.

Typical of the iron-base superalloys referred to are those having the following weight percentage range of composition of ingredients:

TABLE III

Iron Base Alloys

| Element | Weight Percent |
|---|---|
| Cobalt | 0 to 20 |
| Chromium | 15 to 21 |
| Nickel | 20 to 26 |

Balance essentially iron in a quantity of at least 35 percent and preferably and usually more than 50 percent by weight, although, in addition, the alloy may include the following elements in relatively minor quantities: manganese, silicon, aluminum, titanium, molybdenum, vanadium, boron, tungsten, cobalt, carbon, nitrogen and trivial amounts of sulfur, phosphorous, copper, etc.

Table I defines the class of nickel-base alloys which may be joined according to the method of the present invention. Typical examples of these are: Rene 80, Rene 100 and Mar M-200. The nominal compositions of these in weight percent are given below in Table IV.

TABLE IV

Nickel Base Superalloys

| Element | Rene 80 | Rene 100 | Mar M-200 |
|---|---|---|---|
| | | Weight Percent | |
| Nickel | Bal. | Bal. | Bal. |
| Chromium | 14.0 | 9.5 | 9.0 |
| Cobalt | 9.5 | 15.0 | 10.0 |
| Titanium | 5.0 | 4.20 | 2.0 |
| Aluminum | 3.0 | 5.50 | 5.0 |
| Tungsten | 4.0 | | 12.5 |
| Zirconium | 0.03 | 0.06 | 0.05 |
| Molybdenum | 4.0 | 3.00 | |
| Boron | 0.015 | 0.015 | 0.015 |
| Silicon | 0.2 | 0.50 | |
| Carbon | 0.17 | 0.18 | 0.15 |
| Manganese | 0.2 | 0.50 | |
| Iron | 0.2 | 1.0 max. | 1.5 max. |
| Vanadium | | 1.0 | |

EXAMPLE 1

In order to prepare a brazing alloy, identified herein as composition A, suitable in particular for joining Rene 80, the following steps were taken. A specimen of Rene 80 nickel-base superalloy corresponding to the composition of two pieces to be joined was cast. Because it is difficult, as will be explained further below, to microscopically locate in the Rene 80 alloy the lowest melting segregate (see FIG. 1), the specimen was first incipiently melted for ease of location of the segregate regions of interest, and the incipiently melted material (see FIG. 2) was examined in an electron microbeam probe analyzer. The incipiently melted segregate region thus located was analyzed quantitatively by the microbeam probe to determine its chemical constituents. The analysis so determined is listed below in Table V.

A braze alloy material having a composition as listed in Table VI, (substantially of the composition determined according to Table V but with nickel content adjusted to equal the balance) was then prepared in powder form and inserted between the two pieces of Rene 80 superalloy to be joined. The two pieces of superalloy and the inserted braze material were then heated uniformly together at a temperature at which the prepared braze alloy melts, but below the melting temperature of the superalloy. The braze alloy melted and diffused into the adjoining superalloy to become substantially integral therewith.

The resulting bonded pieces can then be progressively solution heat treated in order to further diffuse the braze material into the adjoining pieces until the braze composition becomes a more integral part of the adjoining alloy, preferably in solid solution.

Figure 2:
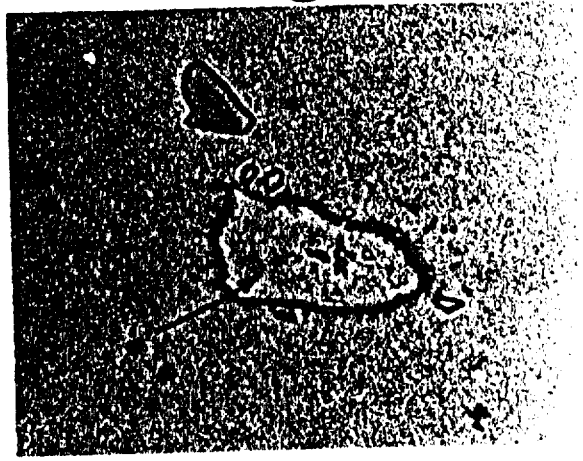
FIG. 2 is a photomicrograph (2,000 X) of the same alloy as in FIG. 1, showing a corresponding segregate which has been incipiently melted and illustrates that the segregate melts at a lower temperature than the remainder of the alloy.

The photomicrograph of FIG. 2 shows a specimen of Rene 80 with the segregated low melting region in incipiently melted condition, and the arrow in the figure points to the segregate corresponding to the region investigated and analyzed by the microbeam probe described in Example 1 and having the analysis of Table V below. It will be understood, of course, that the compositions can also be determined by other known chemical analysis procedures.

TABLE V

Microprobe Analysis

| Element | Weight Percent |
| --- | --- |
| Nickel | 56.60 ± 2.42 |
| Chromium | 15.28 ± 0.69 |
| Cobalt | 10.62 ± 1.17 |
| Titanium | 5.82 ± 0.43 |
| Aluminum | 1.34 ± 0.83 |
| Tungsten | 0.97 ± 0.99 |
| Zirconium | 5.55 ± 3.90 |
| Molybdenum | 3.83 ± 0.60 |

As in any chemical analysis, the above analysis is only accurate to within the error of the analyzing instrument or method employed, and varies with the respective element analyzed. The variation intrinsic to the specific microprobe employed for the analysis listed in Table V is included opposite the respective weight percent.

TABLE VI

Composition A

| Element | Weight Percent |
| --- | --- |
| Nickel | 56.59 |
| Chromium | 15.28 |
| Cobalt | 10.62 |
| Titanium | 5.82 |
| Aluminum | 1.34 |
| Tungsten | 0.97 |
| Zirconium | 5.55 |
| Molybdenum | 3.83 |
| Total | 100.00 |

Figure 3:
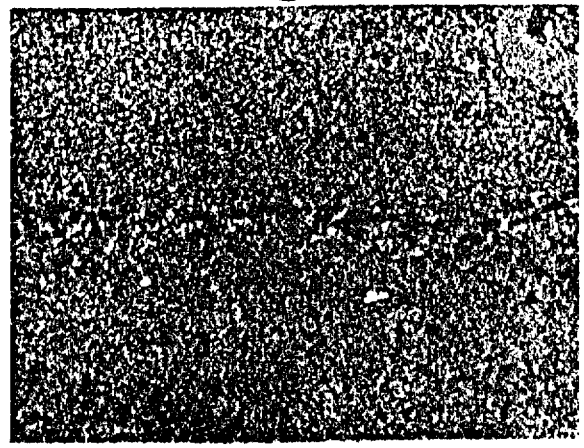
FIG. 3 is a photomicrograph (250 ×) illustrating the microstructure of a bond of superalloy pieces of Rene 80 made according to the invention, before the progressive heat treatment step to make the bond zone fully integral with the joined pieces.

FIG. 3 of the drawings illustrates (250 ×) the bond produced according to Example 1. The two Rene 80 superalloy pieces joined can be seen in FIG. 3 above and below the horizontal zone which is the bond made using the prepared composition A.

The properties important for braze alloys were determined for composition A used in Example 1 and these properties are listed in Table VII.

Table VII

Liquidus temperature: 2,225°F
Solidus temperature: 2,125°F
Wetability: adequate

The joint prepared according to Ex. 1 was impact tested and yielded results which were superior to identical specimens made from joints prepared by prior art methods.

It will be understood that the incipient melting step included in Example 1 above for Rene 80 alloy is not always necessary in order to locate and identify under the microscope the segregated regions of the alloy being investigated. For example, in the Rene 100 alloy the segregate is more easily visible. To further illustrate this, FIG. 4a, a photomicrograph of Rene 100, is shown to illustrate that this segregate or low melting region is more clearly visible microscopically than in the alloy Rene 80 of FIG. 1. Specimens of Rene 100 therefore do not require the extra step of incipient melting to locate the low melting segregates. The greater proportion of titanium plus aluminum present in the Rene 100 alloy makes the low melting regions more visible.

Figure 4A:
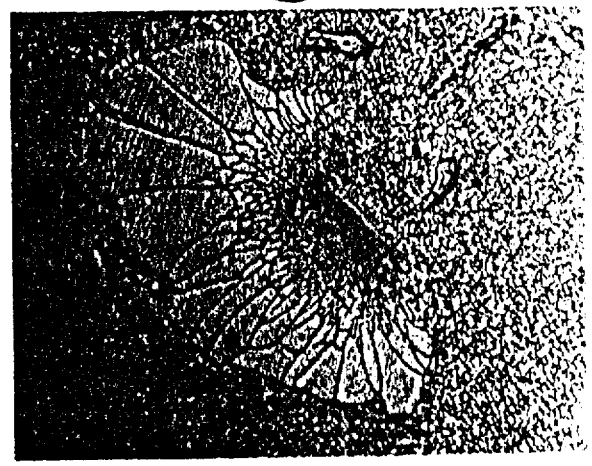
FIGS. 4a, 4b and 4c are all photomicrographs (1,000 ×) of another nickel-base superalloy, Rene 100, in respectively different conditions.
Figure 4B:
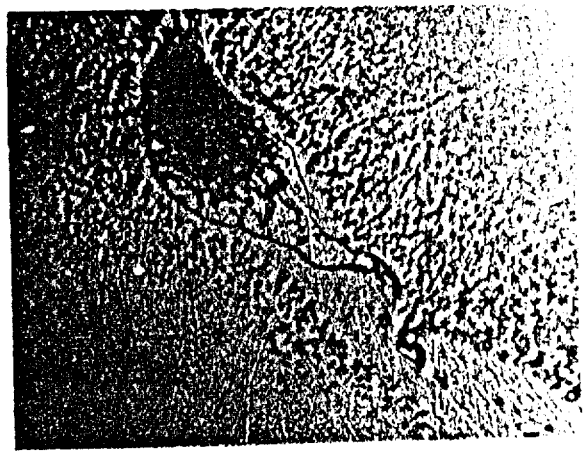

FIG. 4b shows the microstructure of the same alloy as in FIG. 4a but partially solutioned by a progressive heat treatment. FIGS. 4a and 4b thus demonstrate that the low melting regions of this type of superalloy can be solutionized.

Figure 4C:
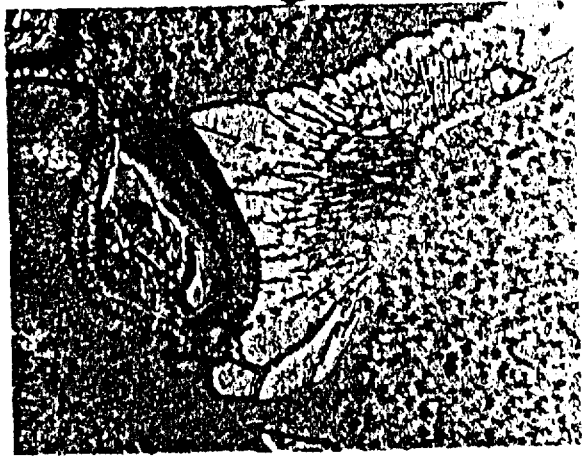

FIG. 4c is a Rene 100 alloy partially incipiently melted. Thus, FIGS. 4a and 4c together illustrate that the segregate regions of interest (for analysis to determine an appropriate candidate for a brazing alloy composition) can be melted at a lower temperature than the surrounding alloy; and FIG. 4b demonstrates that these segregated constituents of the composition can be solutioned into the remainder of the superalloy.

Furthermore, after the composition of the selected alloy has been determined, the percentage composition may be modified or one or more elements added for specific properties. For example, boron may be added to lower the melting point, but in a specific amount to avoid the formation of complex borides which may embrittle the composition. Boron may be added to the composition A in amounts from 0 to 1.0 weight percent to achieve a lowering of the liquidus and solidus temperatures, as shown below in Table VIII.

Other elements such as silicon, manganese, columbium and tantalum and their mixtures may also be added to optimize the properties of the brazing alloy.

TABLE VIII

| | Weight percent | °F | |
| --- | --- | --- | --- |
| | Boron | Liquidus | Solidus |
| Composition A | none | 2225 | 2125 |
| Composition B | 0.498 | 2175 | 2075 |
| Composition C | 0.744 | 2150 | 2075 |
| Composition D | 0.990 | 2150 | 2075 |

Thus, in order to optimize the resulting properties of the braze alloy determined and prepared according to the foregoing method, the added elements, in addition to boron, may be selected according to known superalloy development and brazing procedures. For instance, to increase resistance to high temperature oxidation the aluminum content may be increased.

Thus, the method of the present invention, in addition to the steps of determining and preparing a braze material composition utilized as in Example 1, can further include adding amounts of other elements to the determined composition for specific purposes, and within limits which do not introduce undesirable properties and which keeps the braze alloy compatible and solutionable in the adjoining superalloy.

It will be obvious to those skilled in the art upon reading the foregoing disclosure that many modifications and alterations in the method steps and in the specific compositions may be made within the general context of the invention, and thus numerous modifications, alterations and additions may be made thereto within the true spirit and scope of the invention as set forth in the appended claims.

What we claim as new and desire to secure by Letters Patent of the United States is:

1. A method of forming an integral joint bonding together superalloy pieces, which comprises the steps of:
   a. melting and casting a specimen of the alloy composition of at least one of the superalloy pieces to be bonded together,
   b. applying between said superalloy pieces a brazing material consisting essentially of a composition corresponding to the lowest melting segregate of said one of the superalloy pieces, and
   c. heating the pieces to be bonded with the brazing material therebetween simultaneously to a temperature below the lower melting of said superalloy pieces but above the melting point of said brazing material in order to join said pieces to said material.

2. Method according to claim 1, further including the step of progressively heat treating the joined pieces and said brazing material therebetween to further diffuse and solutionize said material into the adjoining alloy of said pieces.

3. Method according to claim 1, further including the steps of:
   a. examining the microstructure of said cast specimen of said one superalloy piece to locate the lowest melting segregate thereof,
   b. determining the chemical analysis of said lowest melting segregate, and
   c. preparing a brazing material having ingredients corresponding substantially to the chemical analysis so determined, for use in said step of applying the brazing material between said superalloy pieces.

4. Method according to claim 3 further including, prior to said step of determining the chemical analysis, the step of incipiently melting said lowest melting segregate for ease of location and identification thereof.

5. Method according to claim 3, said step of preparing the brazing composition further including adding to said ingredients from a trace to about 1.0 weight percent of boron.

6. Method according to claim 5, said step of preparing the brazing composition further including adding to said ingredients from a trace to 2.0 weight percent of an element selected from the group consisting of: silicon, manganese, columbium, tantalum and their mixtures.

7. Method according to claim 1, said superalloy pieces to be bonded together all having compositions selected from the group consisting of nickel-base, cobalt-base and iron-base alloys, each piece of a respective pair of said pieces to be bonded having a composition belonging to the same type base of said group.

8. Method according to claim 7 wherein said superalloy pieces to be bonded are each of nickel-base alloys.

9. Method according to claim 7 wherein said superalloy pieces to be bonded are each of cobalt-base alloys.

10. Method according to claim 7 wherein said superalloy pieces to be bonded are each of iron-base alloys.

11. Method according to claim 1, said superalloy pieces each being a nickel-base superalloy, at least said one piece being Rene 80, said brazing material consisting essentially of:
   from about 54.1 w/o to about 59.0 w/o nickel,
   from about 14.6 w/o to about 16.0 w/o chromium,
   from about 9.4 w/o to about 11.8 w/o cobalt,
   from about 5.4 w/o to about 6.2 w/o titanium,
   from about 0.5 w/o to about 2.2 w/o aluminum,
   from about trace to about 2.0 w/o tungsten,
   from about 1.6 w/o to about 9.5 w/o zirconium, and
   from about 3.2 w/o to about 4.5 w/o molybdenum.

* * * * *